Jan. 23, 1973 P. A. VENA 3,713,017

FREQUENCY SHIFT KEYED APPARATUS

Filed Oct. 13, 1971

United States Patent Office 3,713,017
Patented Jan. 23, 1973

3,713,017
FREQUENCY SHIFT KEYED APPARATUS
Peter A. Vena, Costa Mesa, Calif., assignor to Collins Radio Company, Dallas, Tex.
Filed Oct. 13, 1971, Ser. No. 188,405
Int. Cl. H04l 27/12
U.S. Cl. 332—9 R 5 Claims

ABSTRACT OF THE DISCLOSURE

A digitalized FSK modulating system whereby the transition between frequencies provides substantially continuous phase characteristics.

The present invention is generally related to electronics and more specifically related to a frequency shift keyed (FSK) system. Even more specifically, the invention is directed toward a digitalized FSK system.

In very high frequency transmission systems, two different frequencies of transmission can sometimes be selected such that each of the frequencies will complete different numbers of full cycles in a given bit time period. This technique may allow for substantially continuous phase characteristics. The continuous phase characteristic is important in preventing the introduction of discontinuities and self-generated noise into the system which occurs when switching during the peak of a pulse in a cycle of operation. It is generally desirable to provide the switching function during a zero power condition. In lower frequency systems it is seldom possible, considering the bandwidth available, to select two separate frequencies which will both provide complete cycles within an appropriate bit time period. The present invention was thus originated for low frequency operations but will operate equally well in high frequency systems.

It is, therefore, an object of the present invention to provide a more versatile FSK system.

Figure 1:
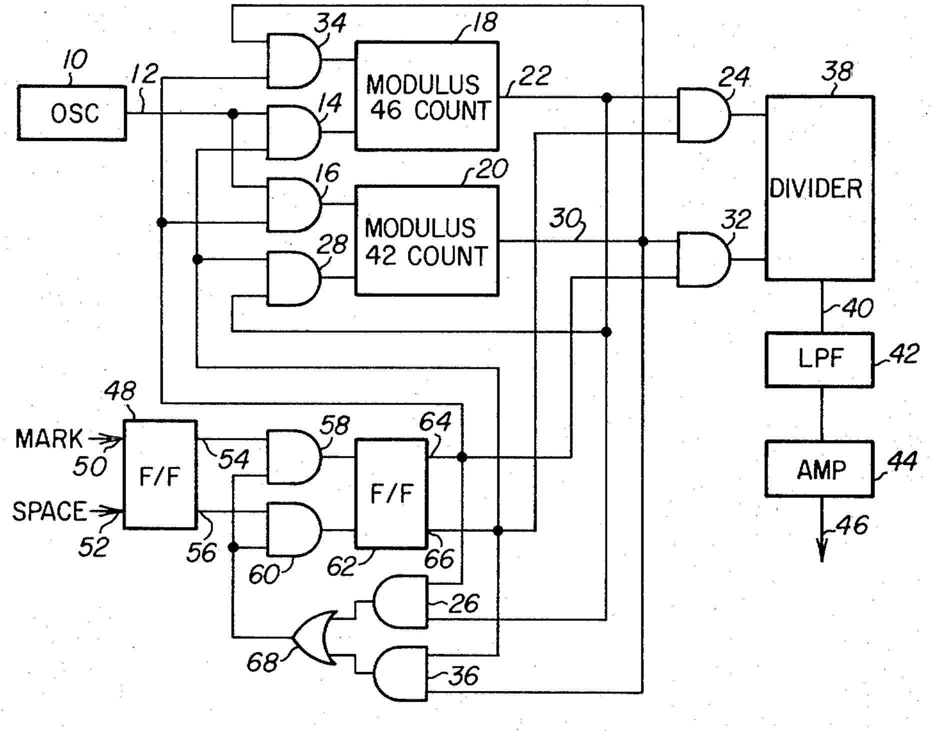

Other objects and advantages of the present invention will be apparent from a reading of the specification and claims in conjunction with the drawings wherein:

FIG. 1 is a detailed block diagram of one embodiment of the invention; and

Figure 2:
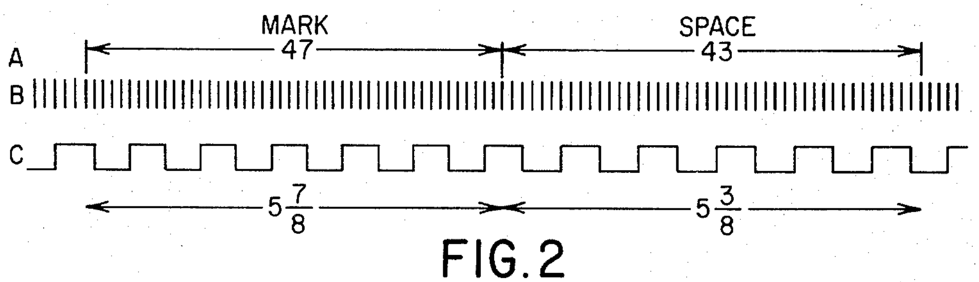

FIG. 2 contains waveforms for use in explaining FIG. 1.

DETAILED DESCRIPTION

An oscillator 10 provides signals on a lead 12 to a pair of AND gates 14 and 16. This signal, in one embodiment of the invention, occurred at 16,168 cycles or pulses per second. An output of AND gate 14 is supplied to a modulus 46 counter 18 which provides an output every 47th input. An output of AND gate 16 is provided to a modulus 42 counter 20 which provides an output every 43rd input pulse. Counter 18 has an output 22 which is connected to a first AND gate 24, a second AND gate 26 and a third AND gate 28. Counter 20 has an output 30 connected to a first AND gate 32, a second AND gate 34 and a third AND gate 36. The outputs of AND gates 24 and 32 are supplied to a divider 38 which in the given embodiment provides a change in output level upon the occurrence of every 4th input pulse. This output is provided on line 40 to a low pass filter 42 whose output is connected through an amplifier 44 to an apparatus output 46. Incoming data is supplied to a flip-flop 48 which receives MARK inputs at an upper input and SPACE inputs at a lower input. These inputs are designated 50 and 52, respectively. The flip-flop 48 contains outputs 54 and 56 corresponding to the inputs 50 and 52 and which are connected to AND gates 58 and 60, respectively. In amplification, a logic 1 at the MARK input 50 will provide a logic 1 at output 54. If a logic 1 was already being provided at output 54 at the time a logic 1 was received at input 50, the flip-flop 48 would not change. Further, flip-flop 48 would not change until such time as a logic 1 were supplied to input 52 at which time output 56 would be altered to a logic 1. The AND gates 58 and 60 are connected to first and second inputs of flip-flop 62 which has outputs 64 and 66. The flip-flop 62 is similar to flip-flop 48 and provides a logic 1 output at 64 when a logic 1 input is provided from AND gate 58. This same operation occurs at output 66 when a logic 1 is received from AND gate 60. Output 64 from flip-flop 62 is connected to provide inputs to AND gates 16, 26, 32, and 34. Output 66 of flip-flop 62 is connected to provide signals to AND gates 14, 24, 28, and 36. The outputs of the two AND gates 26 and 36 are supplied to an OR gate 68 whose output is connected to supply inputs to AND gates 58 and 60.

In FIG. 2(A) two time periods are marked as MARK and SPACE. These are equal time periods. FIG. 2(B) illustrates the outputs of the counters 18 or 20 as supplied to divider 38. In other words, the 47 pulses shown in the MARK time period are received by divider 38 during the first portion while the 43 pulses from counter 18 are received by divider 38 during the SPACE portion.

The waveform of FIG. 2(C) illustrates the output from divider 38. The low-pass filter 42 removes the higher frequencies from this square wave so that the output from amplifier 44 is a sine wave having the same fundamental frequency as the square wave of FIG. 2(C). As will be noted, the square wave output changes amplitude every 4th pulse of line B in FIG. 2. Thus, the duration of a complete cycle in waveform C changes, depending upon whether the data is a MARK or a SPACE. In the embodiment shown, waveform C occurs at 47 cycles per second or 5⅞ cycles per bit of information where the data occurs at 8 bits per second. Likewise, the waveform C occurs at a rate of 5⅜ cycles per bit or 43 cycles per second during the SPACE data bits.

OPERATION

In discussing the operation of the invention, it may first be assumed that the last data bit received was a MARK, which caused a logic 1 to appear at output 64 of flip-flop 62. Thus, AND gates 16, 26, 32, and 34 are energized. In this condition, counter 20 receives output pulses from oscillator 10 and provides outputs at 30 such as shown in FIG. 2(B) during the MARK time period. These outputs occur upon the reception of each 43rd pulse from oscillator 10. These output pulses occurring every 43rd input pulse are applied to AND gate 36 which, of course, is not activated since a logic 0 is supplied thereto from flip-flop 62. The signals, every 43rd pulse, are supplied through AND gate 32 to the divider 38 so that the output signals shown in FIG. 2(C) may be produced. Finally, the output from counter 20 is supplied to AND gate 34 which, as previously indicated, is activated from flip-flop 62 to be counted by counter 18. Upon the 47th output from counter 20, the counter 18 will provide an output which is blocked by each of the inactive gates 24 and 28 although it is passed through AND gate 26. This output pulse from counter 18 is passed through OR gate 68 and activates each of the AND gates 58 and 60. During the above described counting process, either a further MARK or SPACE indication has been received. If a MARK is received, thereby maintaining flip-flop 48 in its prior position, the gate 58 will pass the logic 1 to flip-flop 62. Flip-flop 62 will remain in the same condition and the above described counting process will continue for one further bit.

However, it may be assumed for the purposes of explanation that a SPACE indication is received as a logic 1 at input 52 of flip-flop 48. Thus, a logic 1 will occur at output 56 rather than at 54. Accordingly a logic 1 will be supplied from AND gate 60 to alter flip-flop 62 whereby a logic 1 appears at output 66 thereof. A logic 1 at output 66 will energize AND gates 14, 24, 28, and 36. With this altered connection, the counter 18 receives the output from oscillator 10 directly and provides an output at 22 every 47th cycle of the output signal. Upon each output at output 22 of counter 18, the counter 20 receives a pulse as well as the divider 38. The divider 38 now causes an output as represented by FIG. 2(C) which has a different and lower frequency for the SPACE condition than was provided during the MARK condition of more pulses per second. Upon the occurrence of the 43rd output of counter 18, an output is obtained from counter 20 to activate AND gate 36 and accordingly one of the AND gates 58 and 60 in accordance with the last received MARK or SPACE data bit.

In summary, the present invention utilizes a pulse producing means which can be switched between one pulse product rate and another by a logic control circuit. The pulse rate is divided to provide an output which changes frequency in accordance with the data input but which frequency change is phase continuous due to the use of divider for producing the output frequency.

The embodiment shown is specifically designed for extra low frequency operation but may be readily modified for other frequencies of operation and thus I wish to be limited not by the specification or drawings but only by the claims wherein I claim:

1. Frequency shift keying apparatus comprising, in combination:

- pulse producing means for providing pulses at first and second pulse rates in accordance with input signals supplied thereto;
- means for supplying input signals to said pulse producing means indicative of first and second values for providing said first and second pulse rates, respectively; and
- first counting means connected to said pulse producing means for receiving pulses therefrom at said first and second rates and for producing an output which changes in amplitude upon each occurrence of a predetermined number of counts.

2. Apparatus as claimed in claim 1 wherein said pulse producing means comprises:

- oscillator means;
- second and third different count counting means; and
- logic means for connecting one of said second and third counting means to receive inputs to said oscillator means and to supply output pulses to said first counting means and the other of said second and third counting means, the one of said second and third counting means receiving the signal from said oscillator means being determined by the received one of said first and second values.

3. The method of producing a frequency shift keyed output signal through the use of a pulse source, first and second counters, a data source, and a divider comprising the steps of:

- counting a first predetermined count of pulses from the pulse source in one of the first and second counters in accordance with one of two types of data to periodically provide a first count output;
- dividing said first count output in said divider means to provide an alternating output in accordance with predetermined counts of the received pulses; and
- counting the first count output pulses from the one counter in the other counter for determining the end of a data bit period and for checking the type of the latest received data.

4. Apparatus of the class described comprising, in combination:

- oscillator means for producing signal outputs at a first given rate;
- data means for producing one of first and second gating signals in accordance with one of first and second data values;
- means for supplying data to said data means;
- first and second couting means each providing an output in response to a different number of signal inputs;
- divider means for providing an output which changes in amplitude upon each occurrence of a given number of signal inputs;
- gating means connecting said oscillator means, said counting means, said dividing means, and said data means together for counting the number of signal outputs from said oscillator means in one of said first and second counting means in accordance with the gating signals supplied in response to the data for supplying the output of that counter to the other of said first and second counting means and to said dividing means.

5. Apparatus as claimed in claim 4 wherein:

- said data means includes means connected to the other of said first and second counting means for receiving periodic outputs therefrom indicating the end of a data period whereby the value of the last received data is checked for possible alteration of said gating signals.

References Cited

UNITED STATES PATENTS

| | | | |
|---|---|---|---|
| 2,994,790 | 8/1961 | Delaney | 332—9 R X |
| 3,421,088 | 1/1969 | Salley et al. | 178—66 R X |
| 3,508,136 | 4/1970 | Danielsen et al. | 325—163 X |
| 3,668,562 | 6/1972 | Fritkin | 325—163 X |

ALFRED L. BRODY, Primary Examiner

U.S. Cl. X.R.

178—66; 325—163; 332—11 R